UNITED STATES PATENT OFFICE.

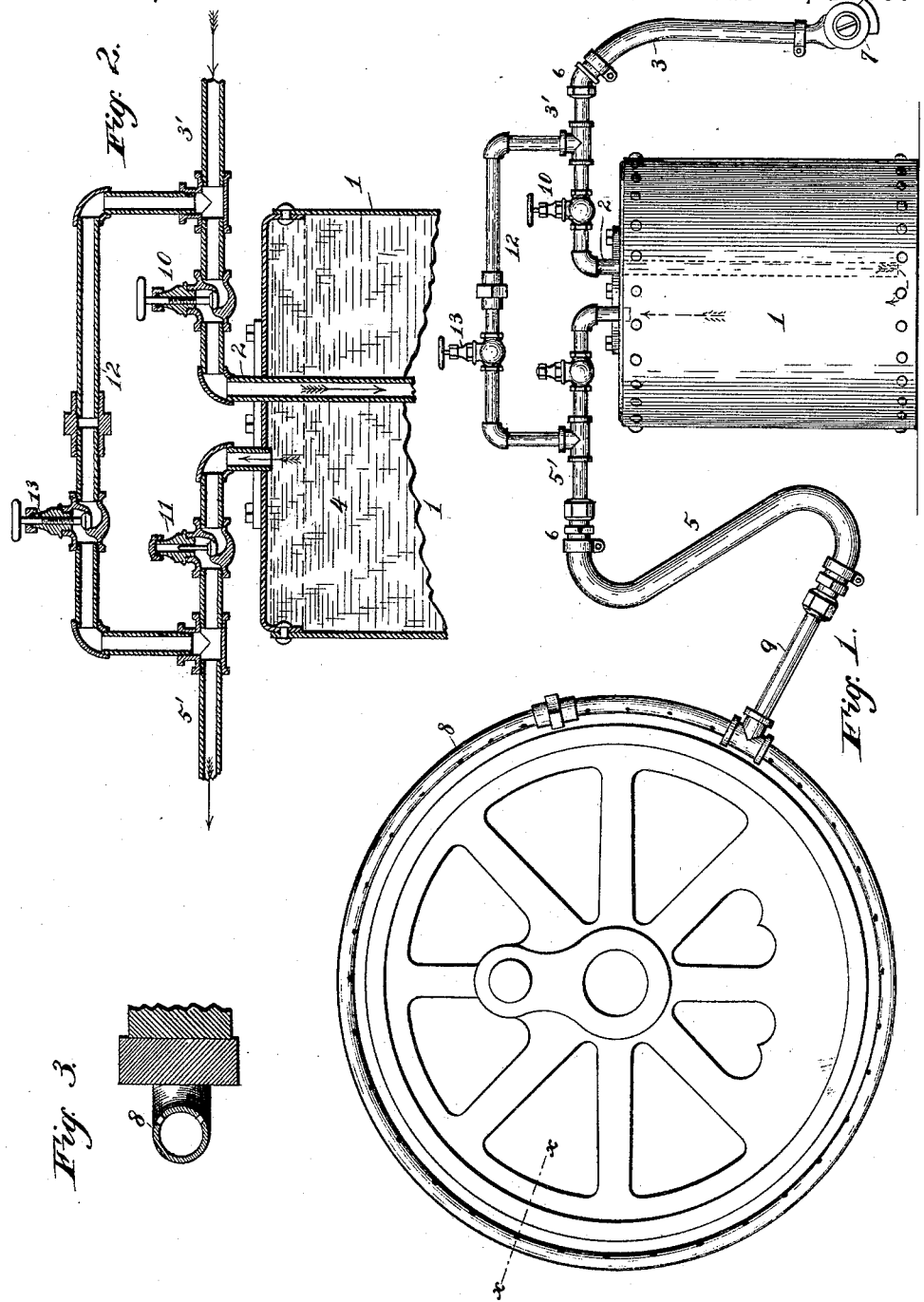

WILLIAM HASSMAN, OF RICHMOND, VIRGINIA.

TIRE-HEATING APPARATUS.

SPECIFICATION forming part of Letters Patent No. 397,593, dated February 12, 1889.

Application filed December 13, 1888. Serial No. 293,462. (No model.)

*To all whom it may concern:*

Be it known that I, WILLIAM HASSMAN, a citizen of the United States, and a resident of Richmond, in the county of Henrico and State of Virginia, have invented certain new and useful Improvements in Tire-Heating Apparatus; and I do hereby declare the following to be a full, clear, and exact description of the invention, such as will enable others skilled in the art to which it appertains to make and use the same.

My invention relates to a portable tire-heating apparatus especially adapted for locomotive-wheels; and it consists of the novel combination of devices and peculiar construction and arrangement of parts, as will be hereinafter fully described and claimed.

The object of my invention is to provide a simple and inexpensive portable apparatus for expeditiously and economically heating the tire of a locomotive-wheel to expand the same, and thereby facilitate its removal from or adjustment to the wheel.

A further object of my invention is to provide the apparatus with novel means whereby a current of non-combustible atmospheric cold air may be blown or projected uniformly against the entire periphery of the heated tire after it has been adjusted on the wheel to facilitate the cooling and hasten the contraction of the tire.

My invention consists of a hydrocarbon tank or reservoir, a valved air-supply pipe entering said tank and having connection with an air-pump, a valved outlet-pipe connected to an annular perforated distributing-pipe, and a valved branch pipe connected to the supply and outlet pipes at points on opposite sides of the valves therein, whereby the blast of cold atmospheric air from the air-pump may be prevented from entering the hydrocarbon-tank and caused to pass through the branch pipe directly to the outlet-pipe, and thence to the annular distributing-pipe, by which it is uniformly thrown or projected upon the periphery of the heated tire to facilitate its cooling and contraction.

To enable others to understand my invention, I will now proceed to describe the same in connection with the accompanying drawings, in which—

Figure 1 is an elevation of my portable apparatus for heating tires. Fig. 2 is a vertical central sectional view through the hydrocarbon tank or reservoir and the several supply, exit, and branch pipes. Fig. 3 is a detail sectional view through the annular distributing-pipe.

Like numerals of reference denote corresponding parts in all the figures of the drawings.

In the embodiment of my invention shown in the drawings, 1 designates the hydrocarbon tank or reservoir of my portable apparatus for heating tires. This tank is preferably composed of a cylindrical metallic vessel having the heads hermetically secured to the shell thereof, and is made sufficiently strong to withstand the pressure of the air to prevent leakage of the compressed air and liquid hydrocarbon. An air-supply pipe, 2, passes through the upper head of the tank or reservoir and extends longitudinally within the same to a point a short distance above the bottom of said vessel, so that the air in said pipe can escape therefrom at the base of the tank. This tank or reservoir contains a liquid hydrocarbon, preferably gasoline, at 86° temperature, and the air discharged into the tank at the base thereof passes through this liquid hydrocarbon, and is permeated or saturated therewith to render it highly combustible.

In order to prevent the liquid hydrocarbon from offering too much resistance to the passage of the air through the same, and thus permit the hydrocarbon vapor to escape freely in the desired quantities from the tank or reservoir, I have provided an absorbent porous filling, (designated by the numeral 4,) which is placed in the tank above the lower open end of the air-supply pipe. This porous absorbent filling, 4, may be of any suitable material—as, for instance, excelsior, sponge, or other substances—which filling absorbs or receives into its pores the liquid hydrocarbon, and at the same time permits the compressed air to pass freely through the same on its way from the bottom of the tank to the exit at the top thereof. An outlet-pipe, 5, also enters the head of the hydrocarbon tank or reservoir, but it does not extend into the tank, so that the compressed air is caused to pass through the absorbent saturated filling the entire length of the tank before it can escape therefrom into the outlet-pipe. These air supply and outlet pipes comprise short metallic sections 3' and 5' and flexible sections 3 and 5, respectively, the two sections of each pipe being suitably coupled together by couplings 6, of any preferred pattern, the metallic sections of said pipes being suitably fixed in the head of the tank.

The flexible section 3 of the air-supply pipe is provided with means whereby it may be coupled to an air pump or compressor, (indicated by the numeral 7,) which pump or compressor may be of any desired pattern.

In order to uniformly distribute the gas or volatile vapor generated in the hydrocarbon tank or reservoir around the periphery of the tire, so as to uniformly apply heat thereto to cause the tire to expand equally in all directions, I have provided an annular distributing-pipe, 8, which is made slightly larger in diameter than the wheel-tire around which it is to be placed, and is provided with two series of transverse apertures, of which one series is located on one side of the pipe and the other series on the opposite side of the same. The unconfined end of the flexible section of the outlet-pipe 5 is provided with a rigid section, 9, which is coupled by a T-shaped elbow with the annular distributing-pipe 8, whereby the current of volatile vapor is conveyed directly from the tank to the distributing-pipe, where it can be ignited and consumed to heat the tire and cause it to expand uniformly in all directions.

The rigid section 3' of the air-supply pipe 3 is provided with a cock or valve, 10, which can be turned by hand to cut off the entrance of the air from the air-pump to the tank or reservoir, and the corresponding section, 5', of the outlet-pipe 5 is provided with an automatic check-valve, 11, to prevent air or vapor from returning into the tank or reservoir.

An intermediate branch pipe, 12, is connected to the air supply and outlet pipes 3 5 on opposite sides of the valves thereof, and this branch pipe is provided with a cock or valve, 13, by opening which and closing the cock 10 of the air-supply pipe the current or blast of atmospheric cold air from the air-pump is conducted directly to the outlet-pipe 5, and thence to the distributing-pipe, without first passing through the hydrocarbon-tank.

The operation of my invention is as follows: When it is desired to remove an old tire on a locomotive-wheel or adjust a new tire thereto, the annular distributing-pipe 8 is adjusted exteriorly around the tire, the supply-pipe 5 connected with the tank and distributing-pipe, the valve in the branch pipe 12 closed, and the air-supply pipe 3 connected to the air-pump, the valve in said pipe being opened. The air-pump is now set in motion to force a current of air through the air-supply pipe into the tank or reservoir, into which it escapes at the bottom thereof and passes upwardly through the saturated absorbent filling to the escape-pipe. This pipe conducts the volatile vapor generated in the tank to the annular distributing-pipe, from which said gas issues through the series of perforations. The gas is ignited and consumed to heat the tire around which the distributing-pipe is placed, and as the heat is uniformly distributed around the entire periphery of the tire the latter is caused to expand in all directions, thus permitting its ready removal from or adjustment to the wheel. After the tire has been properly adjusted to the wheel its contraction can be facilitated by subjecting it to a blast or current of cold air, provision for which I have also made with the same apparatus and without requiring any laborious manipulation or change of parts, it only being necessary to close the valve 10 in the air-supply pipe and open the valve 13 in the branch pipe. The current of air from the air-pump is thus prevented from entering the tank or reservoir and passed through the branch pipe 12 to the outlet-pipe 5, which conducts it (the current of air) directly to the annular distributing-pipe, from whence the cold atmospheric air is uniformly projected at all points of the periphery of the tire, and thus facilitate its cooling and cause it to contract equally.

I am aware that changes in the details of construction and form and proportion of parts of the mechanism herein shown and described as an embodiment of my invention can be made without departing from the spirit or sacrificing the advantages of my invention, and I would therefore have it understood that I reserve the right to make such changes and alterations therein as fairly fall within the scope of my invention.

Having thus fully described my invention, what I claim as new, and desire to secure by Letters Patent, is—

1. In a tire heating and cooling apparatus, the combination of a reservoir or tank, a valved air-supply pipe communicating therewith and adapted to be connected with an air-pump, an annular distributing-pipe, a valved outlet-pipe intermediate of the tank and distributing-pipe, and a valved branch pipe connected to said air supply and outlet pipes at points on opposite sides of the valves thereof, as and for the purpose described.

2. In a tire heating and cooling apparatus, the combination of a tank or reservoir having an absorbent porous filling adapted to contain a liquid hydrocarbon, an air-supply pipe passing through said filling within a short distance from the base of the tank, and having a cock or valve, 10, an air-pump connected to said pipe, an annular distributing-pipe, an outlet-pipe connected to said distributing-pipe and the tank, and having a check-valve, 11, and a branch pipe, 12, connected to the air supply and outlet pipes on opposite sides of the valves 11 12 thereof, and having a cock, 13, substantially as and for the purpose described.

In testimony whereof I affix my signature in presence of two witnesses.

WILLIAM HASSMAN.

Witnesses:
S. BAXTER DAVIS,
CHAS. FISHER.